Oct. 27, 1953   R. H. DICKE   2,656,733
POWER TRANSMISSION
Filed June 7, 1947   3 Sheets-Sheet 1

INVENTOR
Robert H. Dicke
BY
ATTORNEYS

Oct. 27, 1953  R. H. DICKE  2,656,733
POWER TRANSMISSION
Filed June 7, 1947  3 Sheets-Sheet 2

INVENTOR
Robert H. Dicke
BY
ATTORNEYS

Oct. 27, 1953     R. H. DICKE     2,656,733
POWER TRANSMISSION
Filed June 7, 1947     3 Sheets-Sheet 3
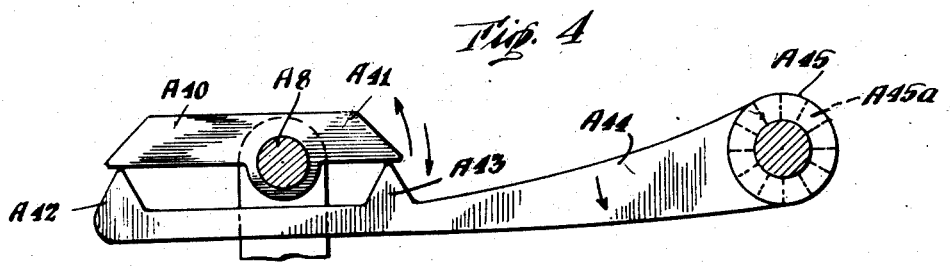
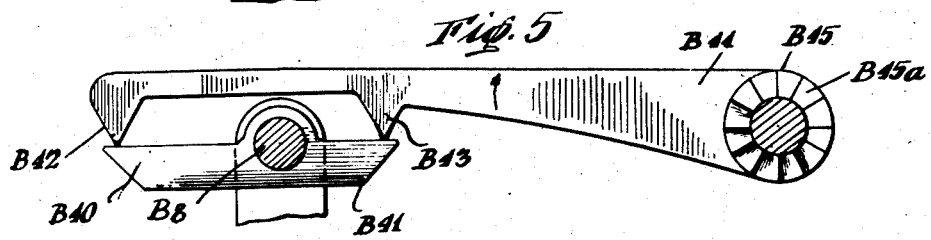
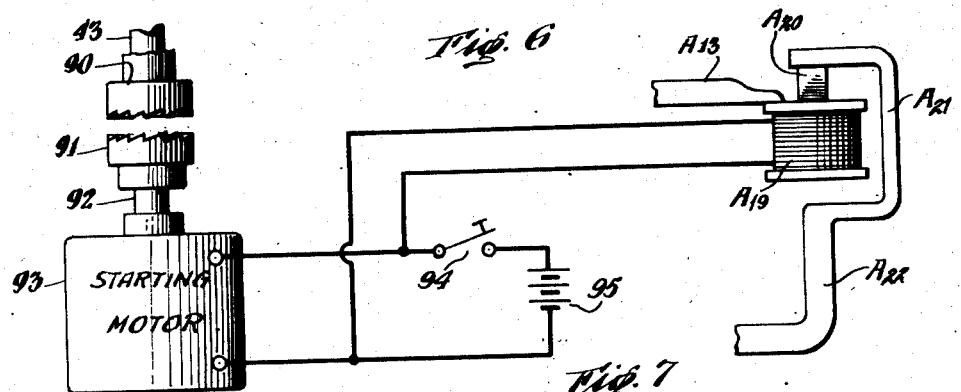
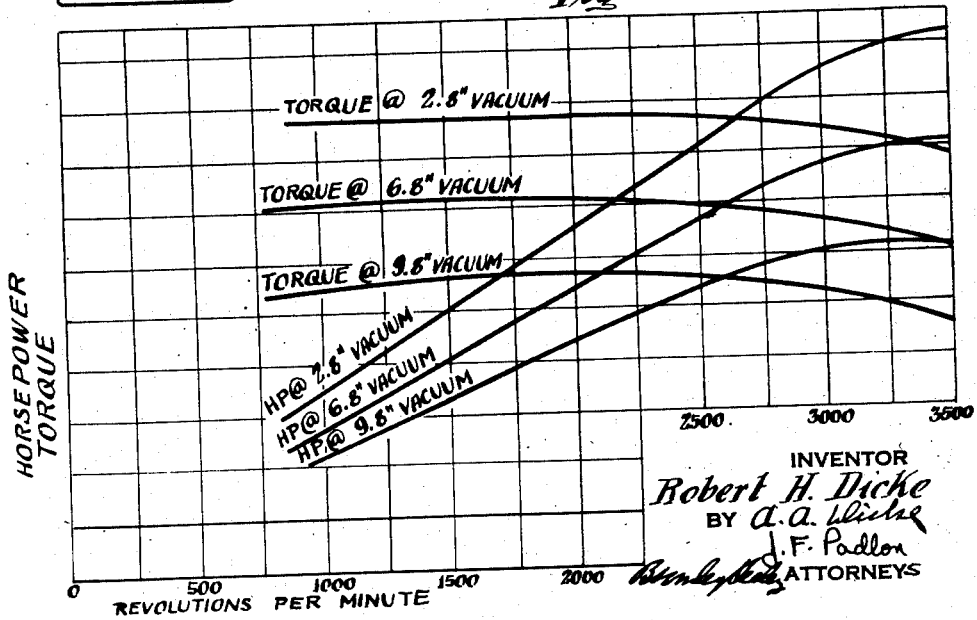
INVENTOR
Robert H. Dicke
BY
ATTORNEYS Patented Oct. 27, 1953

2,656,733

UNITED STATES PATENT OFFICE 2,656,733

POWER TRANSMISSION

Robert H. Dicke, Princeton, N. J., assignor of one-half to Allen A. Dicke, Montclair, N. J.

Application June 7, 1947, Serial No. 753,330

12 Claims. (Cl. 74—472)

This invention relates to improvements in power transmissions and has for an object to provide an improved transmission including energy storing means arranged to receive energy at certain times through at least a part of the transmission and to deliver said energy at other times through at least a part of said transmission.

Another object is to provide such a transmission utilizing at least in part, an improved transmission of the friction type providing infinitely variable speed ratios.

Another object is to provide such a transmission including at least one unit comprising a ball pressed between two discs, said ball being constrained for generally straight line movement for varying the drive ratio.

Another object is to provide such a transmission in which the constraining member comprises a cage which may be adjusted to various positions depending upon the torque thereon resulting from the forces transmitted by the transmission and by external forces applied to said cage.

Another object is to provide such a transmission comprising two infinitely variable speed ratio transmission units arranged in series with an energy storing means such as a flywheel therebetween. The parts being so arranged that the energy storing means may receive from or apply energy to either one of said units.

Another object is to provide such a device in which an internal combustion engine is connected to drive an infinitely variable speed ratio transmission together with means for starting said internal combustion engine connected to transmit energy through said transmission to said internal combustion engine.

Another object is to provide such a transmission in which the speed ratio is varied automatically in accordance with output speed of said transmission and/or in accordance with engine torque and/or in accordance with intake manifold pressure of such an internal combustion engine.

Another object of the invention is to provide a transmission adapted to be driven by a prime mover, the transmission being capable of supplying, for short intervals of time, mechanical energy at a much greater rate than can be applied directly by the prime mover.

Another object is to provide a prime mover, a transmission, containing an energy storage member, driven by said prime mover, and automatically operated controls to cause the prime mover to deliver power at a rate determined by the energy content of the energy storage member.

Another object is to provide a rotary energy storage device, in the form of a flywheel, the axis of which is arranged transverse to the vehicle and the direction of rotation of which is so chosen that the gyroscopic effect thereof, due to precession incident to the vehicle taking a curve, applies a torque tending to cause the vehicle to lean inward.

Another object is to provide such a transmission having a unit the drive ratio of which is controlled in response to the output torque and to externally and manually applied forces.

Another object is to provide a transmission utilizing the principles of the device disclosed in my application for United States patent filed July 24, 1946, S. N. 685,362, Patent 2,596,538, May 13, 1952.

Further objects and advantages of the present invention will be apparent from consideration of the specification as illustrated by the accompanying drawings of possible embodiments of the invention in which drawings.

Figure 1:
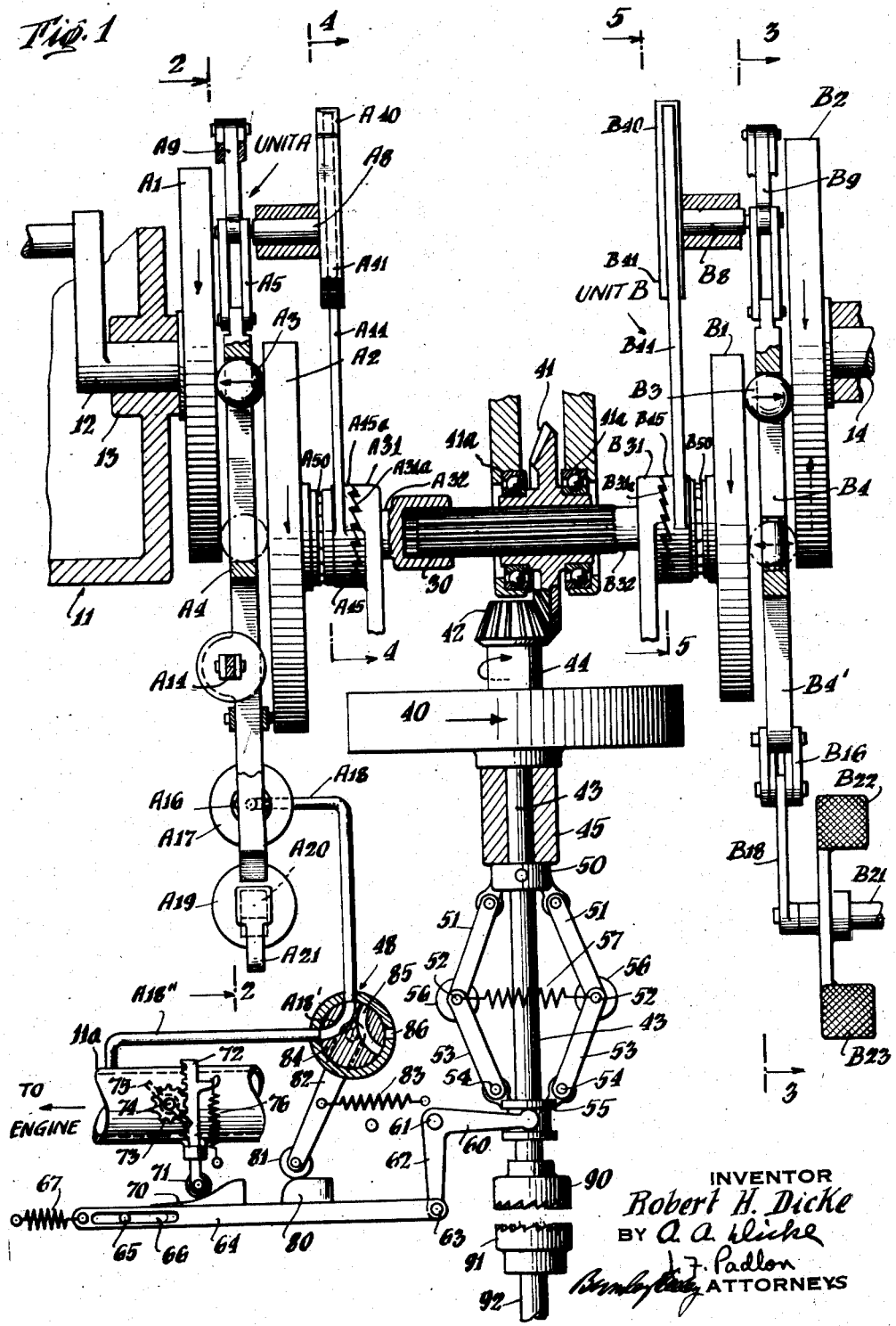
Fig. 1 is a more or less schematic representation of a prime mover such as an internal combustion engine and a form of transmission embodying the principles of the present invention, the parts being shown partly in cross-section.

Figs. 4 and 5 are partial cross-sectional views taken on the lines 4—4 and 5—5, respectively, of Fig. 1.

Fig. 6 is a schematic view showing the electrical connections to the starting motor and to a solenoid energized concomitantly with the starting motor.

Fig. 7 is a chart showing the torque and power of a typical internal combustion engine at several selected intake manifold pressures.

Referring to said figures, the numeral 11 indicates generally a prime mover such as an internal combustion engine having a crank shaft 12 in a bearing 13. The power from said engine is transmitted to unit A of the transmission from which it is transmitted to unit B and delivered thereby to the output shaft 14. The unit A as appears on Figs. 1 and 2 comprises a disc A1 firmly connected to shaft 12 and serving to drive disc A2 through ball A3, which ball is constrained to more or less straight line movement within a constraining cage A4 which is pivoted for movement about the point Ax (Fig. 2) by any suitable means such as the links A5 and A6 pivoted to arm A7 rigidly attached to shaft A8 journalled in the frame (Fig. 1). Said arm has an extension A9 to which is connected link A10, the other end of which is journalled in the frame to an arm A11 pivoted at A12 and having an arm A13 extending generally parallel to cage A4 and its extension A4'.

Connected between arm A13 and the cage arm A4' are the following:

1. Dashpot connection A14.
2. A limited movement connection comprising the link A15 connected to the arm A4' and to the arm A13, one of which connections is preferably a pin and slot connection.
3. An adjustable spring connection comprising spring A16 anchored to arm A13 and to the metal bellows A17 attached to arm A4' with which bellows communicates tube A18.
4. An electro-magnetic device shown as comprising a solenoid A19 carried by arm A13 and a cooperating core A20 supported on bracket A21 connected at A22 to arm A4'.

Discs A1 and A2 are pressed together to clamp the ball A3 therebetween, by any suitable means, preferably by the ball clamping means disclosed in my said prior patent, which means is actuated in response to the torque applied to shaft A8 whereby the ball is clamped by means of a force directly proportional to the forces acting tangentially upon the ball.

As the tangential forces acting upon the balls A3 and B3 respectively vary with their radial positions, the required ball clamping force usually differs in units A and B. For this reason separate ball clamping means are provided. The coaxial discs A2 and B1 are supported in bearings A31 and B31 respectively by means of the shafts A32 and B32, respectively, said shafts being splined together at 30 for relative axial movement. One of the shafts (B32 in the form shown) is splined for axial movement relative to gear 41 which is mounted in bearings 41a. The details of the ball clamping means will be described hereinafter.

Figure 2:
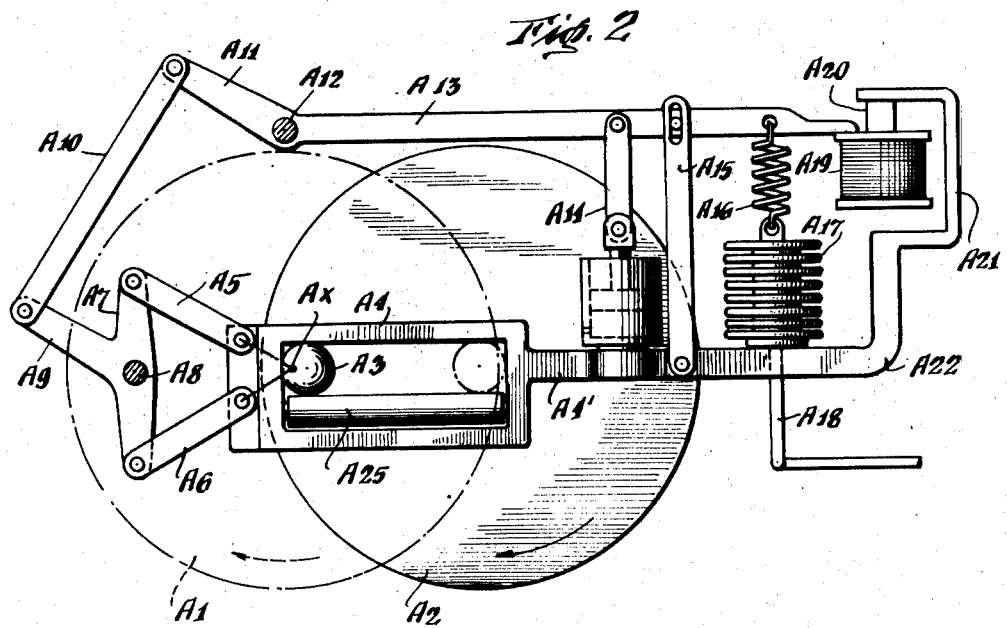
Fig. 2 is a cross-sectional view of the said device taken on line 2—2 of Fig. 1.

It will be seen that when the engine shaft 12 is rotating, the disc A2 will be caused to rotate in the same direction at a speed ratio determined by the location of the ball A3 within its cage A4. The thrust of the ball against the cage is preferably taken by means of the roller A25 (Fig. 2).

The parts are shown with the cage in its central position with its ball slot parallel to the plane intersecting the axes of the discs A1 and A2, in which position the ball A3 will have no tendency to translate in the slot of the cage A4. This condition will exist while the input torque (output torque of the engine) is just sufficient to extend the spring A16 the proper amount to permit the cage to take or retain the position shown. If the balance of forces acting on cage A4 is disturbed in such a manner that the cage A4 will be moved clockwise, the ball A3 will roll to the right. This will cause the speed of disc A2 to increase relative to the speed of the shaft 12 and disc A1 resulting in a decreasing of the torque applied to the disc A2 (assuming that the torque in A1 remains constant). As the center of oscillation of cage 4 (at Ax) coincides with or is close to the axis of rotation of A1, the torque applied to the cage A4 through the force of the ball thereon (usually through roller A25) is twice the torque in A1. The only force which is normally present to counteract the torque in the cage is that exercised by spring A16. This force is directly proportional to the degree of elongation of spring A16 (Hooke's law) which (assuming a certain pressure in bellows A17) is proportional to the displacement of cage A4 and its arm A4' from the position shown. In the position assumed (cage A4 slightly clockwise of the central position shown) the ball A3 will, as stated above, roll toward the right. While so doing, the clockwise torque on cage A4 will gradually decrease, spring A16 will contract and cage A4 will move counterclockwise until it returns to its normal central position. Under the conditions present in vehicle operation the torque applied to disc A2 will vary considerably. These variations cause a corresponding variation in torque on cage A4 resulting in movement of cage A4 and consequently translation of ball A3 in the cage. This movement is such that the speed ratio selected is such as to maintain a constant torque on disc A1 (the reasons for this are set forth more fully in my said application S. N. 685,862). Thus the torque applied to A1, and therefore to the engine 11 will remain constant (irrespective of torque on A2) as long as the pressure in bellows A17 remains at a certain value. In the particular form shown this pressure is normally that existing in the intake manifold between the throttle and the intake valves. Thus as the manifold vacuum increases, bellows A17 will shorten, spring A16 will lengthen, creating an increased counterclockwise torque on cage A4, resulting in the ball A3 moving rightward to such a position as to increase the drive ratio and subject disc A1 and therefore engine 11 to a greater torque. Since for any throttle opening the maximum efficiency of an internal combustion engine is attained when the torque has a certain relation to manifold vacuum, it is possible by the means disclosed to so vary the torque against which the engine must operate as to cause the engine to operate at all times at or near its maximum efficiency.

Bellows A17 is connected to engine manifold 11a by means of tube A18, passage A18' (Fig. 1) in plug valve 48 (which will be described later) and conduit A18".

In that connection reference is made to the chart shown in Fig. 7. It will be seen therefrom that the torque delivered by an internal combustion engine is practically constant for any given intake vacuum irrespective of rotative speed. Thus the torque for any given vacuum changes comparatively little from about 800 to about 3500 R. P. M. The corresponding horsepower, of course, increases with R. P. M. In fact, if the torque were held exactly constant, the horsepower curves would be straight lines. Since the maximum efficiency of an internal combustion engine is attained when the torque has a certain constant value, it is merely necessary to provide a transmission which will so load the engine that it operates as much as possible under the torque which gives optimum efficiency. It is an aspect of the present invention to accomplish this by controlling the speed ratio of the transmission unit A from the engine vacuum. The result of the illustrative means shown is that the engine is permitted, by the transmission, to operate at constant torque which is, insofar as possible, the torque at which maximum efficiency is attained.

The means for clamping the ball A3 between discs A1 and A2 will now be described with reference to Figs. 1 and 2.

Assuming a coefficient of friction of 0.1 the compressive force acting along the horizontal diameter of the ball should be ten times the force acting tangentially upon the ball, viz., five times the force by which the ball A3 bears against the roller A25. The structure shown in Fig. 2 serves to utilize the depressing force of the ball A3 on roller 25 to apply a proportional compressive force upon the ball A3. The force of the ball on roller A25 is met by rocking forces acting upwardly as follows:

(1) At the center of oscillation Ax concentric with disc A1, (2) The spring A16, (3) Reaction of the dashpot transmitted through link A14, and (4) Reaction of the link A15 if and when the pin reaches the end of its slot.

The force at the pivot axis Ax develops a clockwise torque in shaft A8. Similarly, the downward forces (2, 3 and 4 above) apply torque to the arm A13 which is transmitted in equal amount in a clockwise direction to shaft A8 through the members A11, A10 and A9. As best seen in Fig. 4, shaft A8 carries a rocker arm consisting of ends A40 and A41 which bear respectively on projections A42 and A43 of an arm A44, the end of which comprises a hub A45 having helical teeth A45a which bear against helical teeth A31a on the journal A31.

It will be seen that torque applied to shaft A8 (almost always clockwise) will apply a proportional counterclockwise torque to the hub A45 and in view of the proportions shown, this torque transfer will be the same whether or not the torque in A8 is clockwise or counterclockwise. By selecting the dimensions of the various links and levers and the helix angle, the ball clamping force can be made to have the proper relationship to the tangential forces acting upon the ball.

Figure 3:
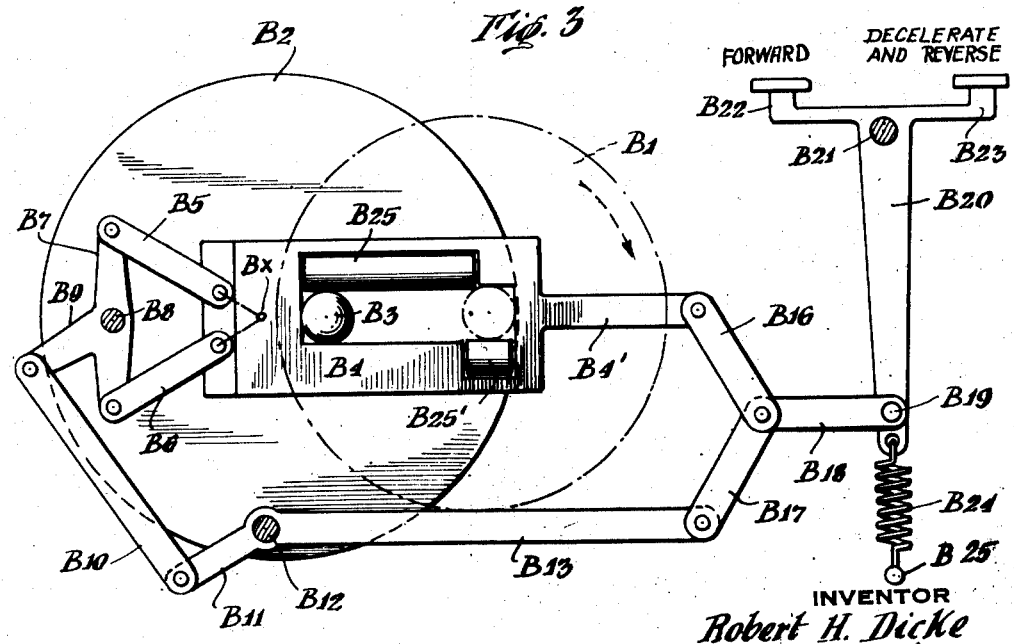
Fig. 3 is such a view taken on line 3—3 of Fig. 1.

The ball clamping mechanism for unit B is the same as for unit A except that the torque applied by the ball B3 to the cage B4 is usually upward, with the result that the resultant torque in shaft B8 is counterclockwise. The corresponding parts are shown in Figs. 1 and 5 and bear corresponding numerals except that the antecedent B is used instead of A. The operation is the same except that it will be noted that the torque applied to hub B45 is always clockwise. It is obvious, however, that the arrangement disclosed for unit A could be used equally well for unit B, in which event the helical faces between the journal B31 and hub B45 would be reversed. It will be noted that thrust bearings A50 and B50 are provided to support the heavy thrust needed to give the necessary compression to the balls A3 and B3. Cooperating with disc B1 through ball B3 is disc B2 connected for rotation with output shaft 14. As best seen in Fig. 3 the ball B3 is constrained by means of a cage B4 having rollers B25 and B25' and mounted for oscillation about center Bx (preferably coincident with axis of disc B2) by means of links B5 and B6 carried by lever B7 mounted on shaft B8 and having an arm B9 to which is pivoted link B10 pivoted to lever B11 journalled to the frame at B12 and having an extension B13. The cage is formed with an extension B4' to the end of which is pivoted a link B16, the other end of which is pivoted to a link B17 pivoted to the end of lever B13. At their connecting pivot the links B16 and B17 are pivoted to a link B18 pivoted at B19 to an arm B20 pivoted at B21 and having extensions B22 and B23 preferably formed as foot pedals for the manual control of the transmission. The control member comprising parts B20, B22 and B23, is normally biased toward its central position as by a spring B24 anchored at B25. As lever B11, B13 is practically immovable, any movement of cage B4 in either direction from the central position shown must be accompanied by movement of lever B20 from its central position and therefore must result in elongating spring B24. Assuming no external force is applied to the pedals B22 or B23 the cage B4 will therefore remain in its central position unless and until it is displaced therefrom by torque thereon about its center of oscillation Bx. Such displacement of cage B4 from normal will result in the ball B3 rolling along the cage slot in such a manner as to always select a position to apply a torque to output disc B2 and output shaft 14 which is proportional to the force applied to cage B4 as a result of the action of the centralizing spring B24. If, now, a pressure is applied to pedal B22 it will cause the cage B4 to move clockwise causing the ball B3 to roll toward the left until the torque applied to the cage B4 is equal to that exerted thereon by pressure on pedal B22. Thus the vehicle is propelled forwardly by means of a torque in shaft 14 proportional to the pressure exerted upon the forward foot pedal B22.

The connecting shaft A32, B32 is connected to drive an energy storing device such as a flywheel 40 as by means of the said bevel gear 41 meshing with a bevel gear 42 on the shaft 43 of the flywheel which shaft is journaled in bearings 44 and 45 mounted on the frame of the vehicle. Flywheel 40 will therefore be caused to rotate in proportion to the speed of discs A2 and B1 and at approximately three times the rotative speed thereof. Connected to rotate with the flywheel 40 is a suitable speed responsive device such as the fly-ball governor consisting of the collar 50 attached to shaft 43 to which are hinged links 51 pivoted at 52 to links 53 respectively, the other ends of which links are pivoted at 54 to a collar 55 slidable on shaft 43 but rotating therewith. Weights 56 are located at the pivots 52 and serve as centrifugal masses. Spring 57 tends to hold the masses 56 inwardly. As will be readily understood, when the speed of shaft 43 is increased the weights 52 will move outwardly against the bias of spring 57. During this time collar 55 is drawn toward the flywheel. Said collar is formed with a groove within which is received the ends of a forked lever 60 pivoted at 61 and having an arm 62 pivoted at 63 to a link 64 suitably supported as by a pin 65 acting in slot 66. If desired, a spring 67 may be provided to bias the link 64 toward the left as viewed in Fig. 1. Said link 64 is provided with a suitably shaped cam 70 with which cooperates a roller 71 carried by a slidably mounted rack 72 having teeth engaging a pinion 73 mounted on a shaft 74 which carries the butterfly valve disc 75 which constitutes the throttle of the engine. Spring 76 draws the rack 72 downwardly keeping roller 71 in engagement with the cam 70. It will be readily seen that this mechanism serves to close the throttle as the speed of flywheel 40 increases.

The link 64 also carries a cam 80 with which cooperates a roller 81 carried on arm 82 which is biased counterclockwise as by spring 83. Said arm is connected with the plug 84 of a rotary plug valve 48 which contains the aforementioned conduit or passage A18' and the passage 85. In the position of the parts shown the flywheel 40 is running at an intermediate speed. At a very low speed thereof or when it is stationary, the link 64 will be move to the right causing the throttle 75 to be wide open and causing the passage 85 to connect the tube A18 with the atmosphere at the vent 86. This mechanism is deemed desirable because it assures that no substantial torque is applied to the disc A1 and therefore to the engine, through the action of spring A16 until flywheel 40 has attained a certain speed.

*Engine starting.*—Since the ball A3 may be at or near the axis of disc A2 when the engine is to be started, it is desirable not to provide means for turning over the engine for starting but rather to have the starting mechanism applied to rotate shaft 30. By the means shown this is accomplished by providing the shaft 43 with any suitable starter engaging means such as the toothed member 90 with which cooperates a corresponding toothed member 91 carried by the shaft 92 of the starting motor 93. Starting will usually occur when the ball A3 is in the dotted line position shown in Fig. 1, viz., at the axis of disc A2. Operation of the starter motor will in this position not be able to turn over the engine. It is therefore deemed desirable to provide means to cause the ball A3 to roll away from said position. This is accomplished by means of the solenoid A19, A20 referred to above. Referring to Fig. 6, when the starter switch 94 is closed the starting motor will be energized from the battery 95. At the same time the winding of solenoid A19 will be energized, tending to draw the arm A4' (Fig. 2) and cage A4 clockwise. This will cause the ball A3 to roll from the dotted line position (Figs. 1 and 2) toward the full line position. As this takes place the engine is turned over with gradually increasing speed. As soon as the motor fires, the starting switch will be released and the solenoid de-energized. Thereafter the transmission unit A will be automatically controlled in accordance with the torque applied thereto and the pull of spring A16 as influenced by the degree of vacuum in the intake manifold 11a (as soon as shaft 43 and flywheel 40 attain sufficient speed to move the plug valve to the position shown in Fig. 1).

Operation

It will be noted from the above that the engine drives the variable speed transmission unit A, which is so designed that the torque acting on the engine is proportional to the force exerted by the spring A16 as affected by the bellows A17 (viz., the manifold vacuum). The transmission unit A drives the flywheel 40, as through a gear train, and it also drives the intake disc B1 of transmission unit B directly. Transmission unit B is so designed that the output torque thereof, which acts on the drive wheels of the vehicle, is proportional to the force exerted on the "forward" pedal B22. It will be understood that this torque will be reversed when the "reverse" pedal B23 is depressed.

The throttle of the engine is controlled in accordance with the speed of the flywheel 40 and is wide open when the flywheel is at rest and is closed almost completely when the flywheel is turning at maximum speed at which time the engine will idle.

The following steps will be considered:

*Starting the engine.*—The engine and all parts of the transmission are assumed to be at rest, the throttle being wide open. It is assumed that ball A3 is in the dotted line position and that ball B3 is in the line with the axis of disc B1. The starting switch 94 being now closed, the part 91 engages part 90 and rotates shaft 43 and flywheel 40. At the same time, solenoid A19 applies a clockwise torque to cage A4 so that the ball A3 rolls toward the left (Fig. 2) causing the engine to be turned over. As the throttle is entirely or substantially fully open, the engine runs rapidly for a brief period. The starting switch 94 is then opened, de-energizing the starting motor and solenoid A19. The solenoid, being no longer able to exert torque on cage A4, the ball A3 rolls toward the right (Fig. 2) until sufficient torque is applied to cage A4 to balance the pull of spring A16 as influenced by the bellows A17 (viz., the intake vacuum). The engine gradually slows down as the flywheel speeds up and the thottle closes until the engine idles while the flywheel runs at top speed.

*Starting the vehicle.*—The "forward" pedal B22 is now depressed. This turns the cage B4 clockwise causing the ball B3 to roll from its neutral position (coaxial with disc B1) toward the left (Fig. 3). In so doing, disc B2 and drive shaft 14 are caused to rotate under a torque proportional to the force applied to pedal B22. The vehicle is therefore given a strong acceleration forward, the necesssary energy being obtained largely from the flywheel and partly from the engine. As the flywheel begins to slow down due to its energy being imparted to disc B2 and through shaft 14 to the vehicle, the throttle is opened by the speed responsive governor.

*Vehicle running at constant speed.*—The desired vehicle speed having been attained, the pedal B22 is gradually released until the ball B3 assumes that position where just sufficient torque will be applied to the shaft 14 to deliver the energy consumed by friction. The parts will thereupon assume a position where the flywheel is running at a constant intermediate speed, viz., that speed at which the throttle will be opened just sufficiently to permit the engine to deliver the power necessary to keep the vehicle in motion at the said constant speed. The engine will be running at a constant speed delivering all of its power to the drive wheels of the vehicle. The engine speed will be relatively low and will be automatically adjusted to substantially its most efficient operating speed, this being controlled by the intake vacuum acting through the bellows A17 and spring A16.

*Coasting.*—No force is applied to pedals B22 or B23. All the power from the engine is delivered to the flywheel which speeds up until the engine slows down to idling speed. The ball B3 assumes an intermediate position.

*Stopping the vehicle.*—The decelerator pedal B23 is depressed. This causes the ball B3 to roll toward the right (Fig. 3) increasing the speed of the flywheel 40. The kinetic energy of the vehicle is transmitted to the flywheel which continues to speed up as the vehicle slows down. During this time ball B3 moves closer to the axis of disc B1 and reaches said axis as the vehicle comes to a stop. At this time the force on the decelerator pedal B23 is released, the engine is at idling speed and the flywheel 40 at a maximum speed.

*Reversing.*—If at this time (or at any time when the engine and flywheel are rotating) pressure is applied to pedal B23, ball B3 will roll beyond the center of disc B1 causing disc B2 and shaft 14 to rotate in a reverse direction.

*Engine stopped.*—With the parts in the condition obtaining at the end of step described under "Stopping the vehicle" above, the ignition is cut off. As the engine slows down and the flywheel 40 and connected parts continue to run, the torque on cage A4 is such that the ball A3 will run to the center of disc A2. The flywheel will continue to run, gradually coming to rest as the result of frictional forces.

In the form described above, ball A3 may have sufficient freedom to reach the center of disc A2. In certain forms of construction it may be desirable to have cage A4 only sufficiently long to permit the ball A3 to move, say, three-quarters of the distance from the full line to the dotted line position in Fig. 2. With this arrangement of the parts, the engine starter may be connected, in the usual manner, to the engine crank shaft as by engaging directly with disc A1, which corresponds to the usual flywheel of a motor vehicle engine.

It wil be noted that a mechanism made in accordance with the invention described above will make maximum use of the energy from the engine. Thus, during deceleration, the kinetic energy of the vehicle is transferred to the flywheel which is accelerated to its maximum speed. If now the vehicle is to be started, as after stopping at an intersection, the pedal B22 is depressed causing the kinetic energy stored in the flywheel to be retransferred to the vehicle. Thus, the vehicle can be accelerated rapidly. This is true even if the engine is small as most of the energy of acceleration is derived from the flywheel during its deceleration. High efficiency is obtained, furthermore, by so controlling the drive ratio of the first transmission unit that the engine will operate at a constant torque (constant manifold vacuum) which is so predetermined as to allow the engine to operate always at maximum efficiency.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. The combination with an internal combustion engine provided with an intake conduit subjected to a variable vacuum, of a first infinitely variable speed ratio transmission having an input member adapted to be driven by such engine, and an output member, a second infinitely variable speed ratio transmission having an input member, and an output member connected to a load, a flywheel connected between the output member of the first transmission and the input member of the second transmission, and control means for said first transmission unit to decrease its drive ratio in response to decrease in the vacuum in said intake conduit.

2. The combination with an internal combustion engine provided with an intake conduit subjected to a variable vacuum, of a first infinitely variable speed ratio transmission having an input member adapted to be driven by such engine, and an output member, a second infinitely variable speed ratio transmission having an input member, and an output member connected to a load, a flywheel connected between the output member of the first transmission and the input member of the second transmission, and control means for said first transmission unit to decrease its drive ratio in response to decrease in the vacuum in said intake conduit together with control means for said second transmission arranged to decrease its drive ratio in accordance with increase in its torque output.

3. The combination with an internal combustion engine provided with an intake conduit subjected to a variable vacuum, of a first infinitely variable speed ratio transmission having an input member adapted to be driven by such engine, and an output member, a second infinitely variable speed ratio transmission having an input member, and an output member connected to a load, a flywheel connected between the output member of the first transmission and the input member of the second transmission, and control means for said first transmission unit to decrease its drive ratio in response to decrease in the vacuum in said intake conduit and in response to increase in the torque delivered by said engine, together with control means for said second transmission arranged to decrease its drive ratio in accordance with increase in its output torque and manual means to affect the control of said second transmission.

4. The combination with an internal combustion engine provided with an intake conduit subjected to a variable vacuum, of a variable speed transmission unit adapted to be driven by such engine and connected to drive a load, and control means for decreasing the drive ratio of said transmission unit responsive to decrease in the vacuum in said intake conduit, said control means comprising a pressure responsive means connected to said intake conduit by means of a conduit, a valve in said connecting conduit and a governor driven by said transmission unit, said governor being connected to said valve in such a way as to maintain said valve closed when the output speed of said transmission unit is low and to gradually open said valve when the output speed of said transmission reaches a certain predetermined higher value.

5. The combination with an internal combustion engine provided with an intake conduit subjected to a variable vacuum, of a variable speed ratio transmission adapted to be driven by such engine and connected to drive a load, and control means for adjusting the drive ratio of said transmission unit in accordance with variations in the vacuum in said intake conduit, said control means comprising a pressure responsive means connected to said intake conduit by means of a conduit and a valve in said connecting conduit which is normally closed, a governor driven by said transmission, said governor being connected to said valve in such a way as to gradually open said valve when the output speed of said transmission reaches a certain predetermined value, a normally open throttle in said intake conduit and connections from said governor to said throttle so arranged as to gradually close said throttle as the output speed of the transmission is increased, whereby the engine speed is so controlled as to tend to maintain the output speed of said transmission substantially constant.

6. The combination with an internal combustion engine provided with an intake conduit subjected to a variable vacuum, of a first variable speed ratio transmission adapted to be driven by such engine, a second variable speed ratio transmission connected to a load, energy storing means connected between said transmissions and control means for said first transmission unit adapted to vary its input torque responsive to the variations in the vacuum in said intake conduit together with control means for said second transmission arranged to vary its output torque in accordance with the force exerted on a manually controlled control member, and control means for the throttle of said internal combustion engine actuated by a governor associated with said energy storage means to cause the output power from the engine to depend upon the energy content of said energy storage means.

7. In combination, an internal combustion engine, a variable speed transmission connected to be driven by said engine and provided with an output shaft, means for starting said engine adapted to drive said output shaft, whereby the engine is turned over for starting by power delivered through said transmission to said engine, said engine starting means comprising an electric motor and a switch for controlling said motor together with electromagnetic means energized concomitantly with said electric motor, and connections from said electromagnetic means to control the drive ratio of said transmission.

8. The combination with an internal combustion engine provided with an intake conduit subjected to a variable vacuum, of a variable speed ratio transmission unit adapted to be driven by such engine and connected to drive a flywheel and a load, and control means for said transmission unit to vary the drive ratio thereof, and means responsive to variations in the vacuum in said intake conduit connected to said control means to operate said control means to cause the drive ratio of the transmission to be decreased when the vacuum in said intake conduit is decreased, together with a control device responsive to the output speed of said transmission unit effective to disable said vacuum responsive control means while said output speed is higher than a certain value.

9. The combination according to claim 8 in which the means for disabling said vacuum responsive control means while said output speed is higher than a certain value, comprises a valve operated by a speed responsive governor driven by said transmission unit.

10. In combination with an internal combustion engine provided with an intake conduit containing a throttle, a first infinitely variable speed ratio transmission driven by said engine and connected to drive a flywheel, a second infinitely variable speed ratio transmission driven by said flywheel and connected to drive an output shaft, means for automatically controlling the engine throttle and the drive ratio of the first transmission in such a way as to cause said first transmission to deliver energy to said flywheel at a rate dependent upon the rate of loss of energy from said flywheel and to cause the engine to operate at that substantially constant torque at which it operates at substantially maximum efficiency, and automatic means for varying the drive ratio of said second transmission to vary the rate at which power is transmitted from said first transmission and flywheel to said output shaft, and manual control means for the means for varying the drive ratio of said second transmission.

11. In combination with an internal combustion engine provided with an intake conduit containing a throttle, a first infinitely variable speed ratio transmission driven by said engine and connected to drive a flywheel, a second infinitely variable speed ratio transmission driven by said flywheel and connected to drive an output shaft, means for automatically controlling the engine throttle and the drive ratio of the first transmission in such a way as to cause said first transmission to deliver energy to said flywheel at a rate dependent upon the rate of loss of energy from said flywheel and to cause the engine to operate at that substantially constant torque at which it operates at substantially maximum efficiency, and means for automatically varying the drive ratio of said second transmission to cause the output shaft to deliver a constant torque, and manual means for determining the amount of torque to be delivered by the output shaft.

12. The combination with an internal combustion engine provided with an intake conduit subjected to a variable vacuum, and a throttle in said intake conduit, of an infinitely variable speed ratio transmission unit adapted to be driven by such engine having an output member connected to drive a flywheel and a second infinitely variable speed transmission unit, said second variable speed transmission unit being connected to drive a load, said engine throttle being operatively connected to and adjustable in accordance with the speed of rotation of said flywheel, said first variable speed transmission unit being so controlled as to have its input torque varied in accordance with the vacuum in said intake conduit, control means for said second transmission unit and manual means for adjusting said control means for said second transmission unit to cause its output torque to be varied in accordance with said manual means.

ROBERT H. DICKE.

References Cited in the file of this patent

UNITED STATES PATENTS

| Number | Name | Date |
|---|---|---|
| Re. 20,824 | Maybach | Aug. 9, 1938 |
| 1,500,043 | Asper | July 1, 1924 |
| 1,710,991 | Kettering | Apr. 30, 1929 |
| 1,838,096 | Fleischel | Dec. 29, 1931 |
| 1,860,017 | Cook | May 24, 1932 |
| 2,044,183 | Peters | June 16, 1936 |
| 2,109,615 | Durham | Mar. 1, 1938 |
| 2,118,590 | Chilton | May 24, 1938 |
| 2,150,456 | Perrine | Mar. 14, 1939 |
| 2,196,064 | Erban | Apr. 2, 1940 |
| 2,233,720 | Velo | Mar. 4, 1941 |
| 2,430,799 | Aspinwall | Nov. 11, 1947 |
| 2,499,071 | Malloy | Feb. 28, 1950 |

FOREIGN PATENTS

| Number | Country | Date |
|---|---|---|
| 788,778 | France | Oct. 16, 1935 |